United States Patent [19]

Köppl

[11] Patent Number: 4,484,086
[45] Date of Patent: Nov. 20, 1984

[54] SWITCHING NETWORK

[75] Inventor: Georg Köppl, Birr, Switzerland

[73] Assignee: BBC, Brown, Boveri & Company, Limited, Baden, Switzerland

[21] Appl. No.: 428,580

[22] Filed: Sep. 30, 1982

[30] Foreign Application Priority Data

Nov. 12, 1981 [CH] Switzerland ............... 7268/81

[51] Int. Cl.³ .................... H02B 1/24; H02J 4/00
[52] U.S. Cl. ......................... 307/112; 307/19;
307/85; 307/113; 307/147; 361/335; 200/145
[58] Field of Search ............ 361/332, 333, 335, 341,
361/425; 307/112, 19, 113, 85, 42, 147, 132 R;
200/145

[56] References Cited

U.S. PATENT DOCUMENTS 3,887,821  6/1975  Stipcevich ................. 307/85 X
4,247,787  1/1981  Page ........................ 307/42 X Primary Examiner—G. P. Tolin
Assistant Examiner—Greg Thompson
Attorney, Agent, or Firm—Burns, Doane, Swecker & Mathis

[57] ABSTRACT

A switchgear installation has at least four junctions connected in the form of an annulus. These junctions are connected with each other by means of interruptable current branches. Each junction of a first group of junctions containing at least two elements may be connected with each junction of a second group of junctions by means of a bridging branch. The bridging branches contain a common power or load switch together with a plurality of disconnecting switches, which are provided between a first supply terminal of the power or load switch and each junction of the first group and between a second supply terminal of the power or load switch and each junction of the second group.

5 Claims, 4 Drawing Figures

SWITCHING NETWORK

BACKGROUND OF THE INVENTION

The present invention relates to a switching network of the type in which at least four junctions are connected with each other in an annular arrangement by means of disconnectable current branches.

A switching network, or switchgear of this type is known for example from an article by B. Stepinski entitled "Novel Aspects of the Construction of Outdoor Switchgear Installations to 765 kv" in Brown Boveri Mitt. 65, 1978 (4), 268 ff. In this installation breaker units are provided; in the current branches connecting the junctions they consist generally of a series circuit of a first disconnecting switch, a power switch, an instrument transformer and a second disconnecting switch. If, in such an installation, a bus bar system or a breaker unit should fail, the supply of power is maintained, as the unaffected junctions of the installation remain interconnected in spite of the disconnection of the affected part of the system.

The safety of the power supply is receiving rising priorities. It is therefore necessary to provide switchgear installations which assure optimum availability and reliability. Thus, for example, A. Klimann proposed in Electrical World, Aug. 15, 1979, page 60 ff, a switchgear installation with a high degree of redundance. In this switchgear, the breakers are connected in the form of "pyramids". This switchgear exhibits an improved degree of safety with respect to the annular arrangement, but a very high number of disconnecting switches, for example 10 power and 33 disconnecting switches in a substation with six fields, involving high space requirements and increased costs.

It is therefore the object of the invention to further develop a switchgear of the aforementioned generic type so that its redundance will be improved substantially at a low expenditure for equipment and with reduced space requirements.

The object of the invention is attained by dividing the network into at least two groups each containing at least two junctions, and connecting each junction in one group with each junction in another group by means of a bridging branch containing a common load switch and disconnecting switches respectively connected between one terminal of the load switch and one of the junctions in each of the two groups. The switchgear installation according to the invention is characterized by high reliability and availability values, without the need for large investments in equipment. As each junction may be connected through three parallel switching points with the rest of the annular system, in case of the failure of a switching point, two further switching points remain, through which the connection of the junction affected by the failure of the switching point with the rest of the annular system is assured. Should then another of the two aforementioned switching points fail, the supply of the affected junction is assured by the functional security of the third switching point.

Examples of the invention are represented hereinbelow with the aid of the drawings in a simplified form.

DETAILED DESCRIPTION

Figure 1:
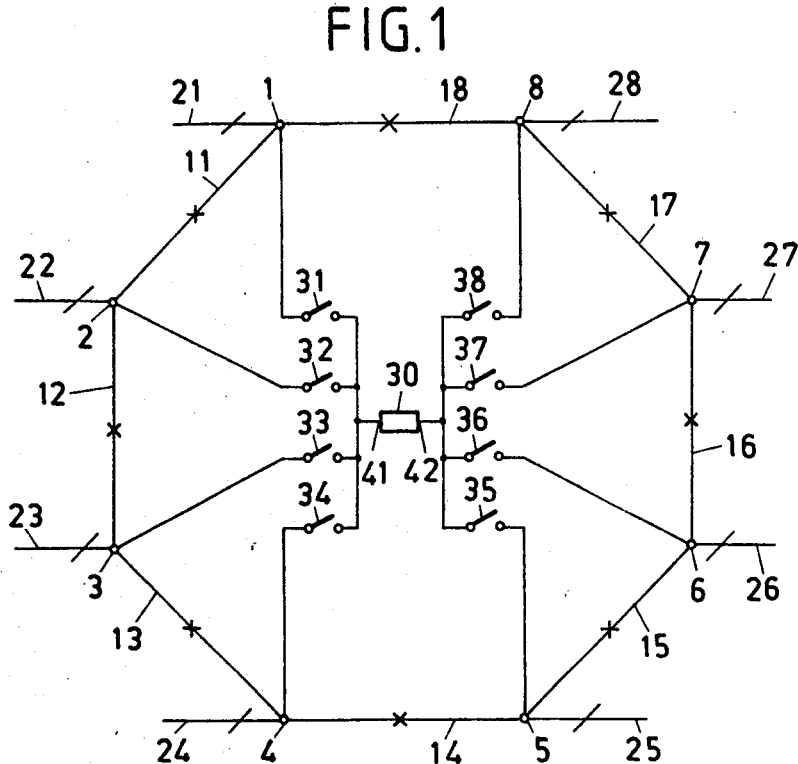
FIG. 1 is a circuit diagram of the switchgear installation according to a invention in which a plurality of annularly connected junctions may be connected in pairs with each other through a power or load switch provided inside the annulus.

In all of the figures, identical parts are identified by identical symbols. The circuit diagram shown in FIG. 1 of the first embodiment of the switchgear according to the invention has the junctions 1 to 8. These junctions are connected in an annular manner and numbered consecutively along the annular circumference. Each of the junctions 1 to 8 is adjacent to two neighboring junctions, with which it is connected by two of the current branches 11 to 18. A switching point (designated by a cross) is provided in each of the current branches 11 to 18. Each switching point may consist of a series circuit of a disconnecting switch with a power or load switch, an instrument transformer and a further disconnecting switch, as shown in the legend to the left of the Figure. At the junctions 1 to 8 current outlet and inlets 21 to 28 are provided. In each of the current inlets and outlets, a disconnecting switch indicated symbolically by a diagonal only, and possibly a surge arrester and a grounding switch, are provided.

According to the invention the junctions 1 to 8 may be connected further by means of current branches. These branches are located inside the annulus and are equipped each with a disconnecting switch 31, 32, 33 or 34, a power or load switch 30 and another disconnecting switch 35, 36, 37 or 38. Each of the disconnected switches 31–34 is connected on one side with one of the junctions 1, 2, 3 or 4 of a first group of junctions and on the other, with a first supply terminal 41 of the power or load switch 30. Each of the disconnecting switches 35–38 is connected on one side with one of the junctions 5, 6, 7 or 8 of a second group of junctions and on the other with a second supply terminal 42 of the power or load switch 30. The power or load switch 30 may be in series with an instrument transformer (not shown) common to all of the current branches.

The mode of operation of an installation of this type is as follows: in its normal operating state the switching points arranged in the current branches 11 to 18 of the annulus are closed and the disconnecting and power switches 30–38 provided in the bridging branches are open. The possibility that, in case of a malfunction three switches may be actuated is thereby prevented. In case of a continuing malfunction at a junction, an annulus may be reestablished by closing one of the bridge branches through the power or load switch 30. If for example, junction 1 is not available, initially the disconnecting switches 32 and 38 and then the power or load switch 30 are closed and an annulus with the junctions 2, 3, 4, 5, 6, 7 and 8 is established.

Even though such a switchgear installation in comparison with a conventional installation with junctions connected exclusively in an annular manner, requires in the case of n number of junctions merely an additional power or load switch and n number of additional disconnecting switches, its redundance is significantly improved by virtue of its ability to reestablish an annulus generally containing all of the unaffected junctions.

Figure 2:
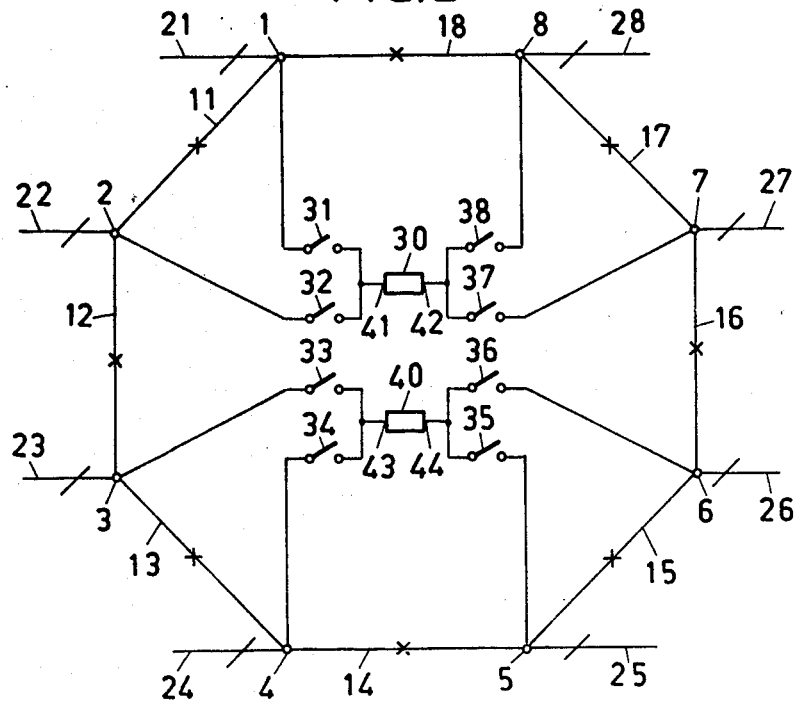
FIG. 2 is a circuit diagram of a switchgear installation according to the invention, in which a first and second and respectively a third and fourth group of annularly connected junctions may be connected with each other through a first and a second power or load switch respectively, by means of bridging branches laid out without crossings.

The embodiment of the switchgear installation shown in FIG. 2 differs from the embodiment according to FIG. 1 essentially in that a second power or load switch 40 is provided, one supply terminal 43 of which is connected with the disconnecting switches 33 and 34, which in turn are connected with the junctions 3 and 4, and the other supply terminal 44 is connected with the disconnecting switches 35 and 36, which in turn are connected with the junctions 5 and 6.

In this installation redudancy is increased with respect to the switchgear of FIG. 1, even though only on additional power or load switch is provided. As the result of the existence of two power or load switches, two highly redundant partial annuli may be formed. Furthermore, since only one-half of the disconnecting switches are connected with the supply terminals of each power or load switch in the bridging branches, compared with the preceding embodiment, in the case of the simultaneous failure of two junctions provided in different groups (for example one of junctions 1, 2, 7 or 8 and one of junctions 3, 4, 5 or 6) the unaffected junctions may still be connected with each other and at least partial annuli may be formed.

Figure 3:
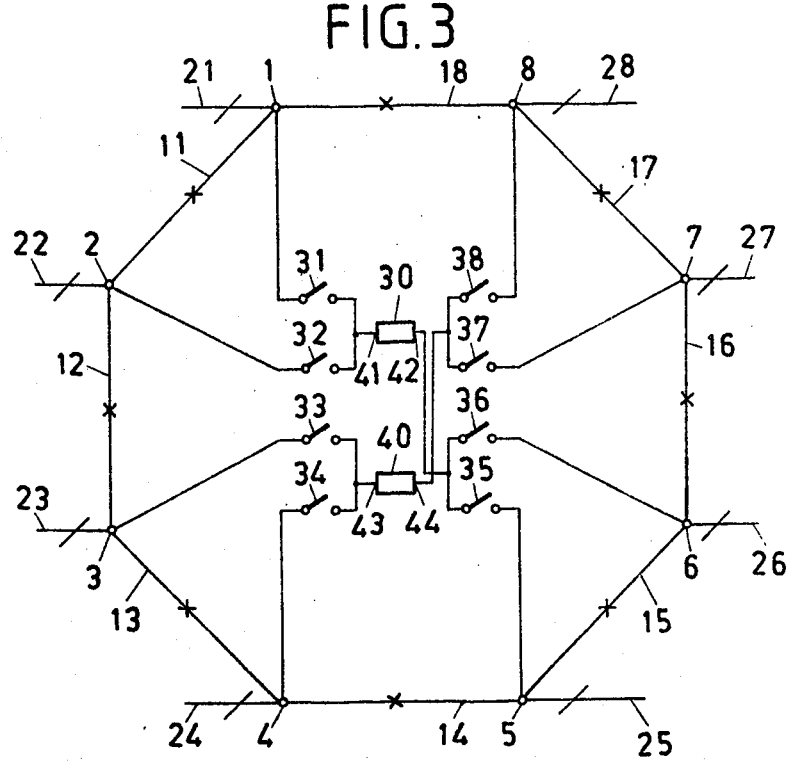
FIG. 3 is a circuit diagram of a switchgear installation according to the invention, in which a first and second and respectively a third and fourth group of annulary connected junctions may be connected with each other through a first and respectively a second power or load switch, by means of bridging branches with single crossings.

The switchgear according to FIG. 3 differs from the installation according to FIG. 2 in that two bridging branches are crossing each other between the terminals 42 and 44 respectively, and the disconnecting switches 35, 36 and 37, 38, respectively. With a switchgear installation laid out in this manner, partial annuli different from those of the aforedescribed installation may be established, whereby with the crossing of the bridging circuits an even greater redundance may be achieved.

Figure 4:
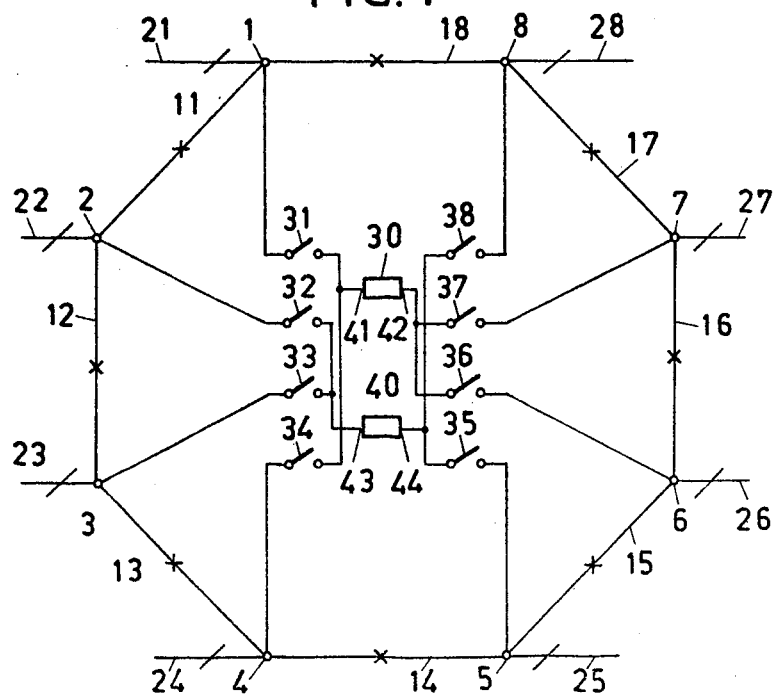
FIG. 4 is a circuit diagram of a switchgear according to the invention in which first and second and respectively third and fourth groups of annularly connected junctions may be connected with each other thorough a first and respectively a second power or load switch by means of doubly crossing bridging branches.

In the installation according to FIG. 4, the bridging branches cross each other between two terminals 41, 42 and 43, 44, respectively, each of the two power or load switches 30, 40 and the associated junctions 1, 2, ... 8, whereby again further junctions may be connected, for example one of the junctions 1 or 4 with one of the junctions 6 or 7, or respectively one of the junctions 2 or 3 with one of the junctions 5 or 8. For every possible combination of two not available junctions in this switchgear installation all of the unaffected junctions may be interconnected, at least by means of partial annuli.

Preferably, the current branches 11 to 18 effecting an annular connection between the junctions 1 to 8 contain conventional high voltage components, such as outdoor switches, transformers and disconnecting switches, connected with each other by means of cables or tubular conductors, but they may also have encapsulated, gas insulated switch points and connecting lines. The bridging branches preferably located in the annulus generally contain components, such as power and disconnecting switches, current transformers and tubular gas cables, similar to those used in encapsulated, gas insulated switchgear installations. These components are connected with the junctions through passages. It is conceivable, however, to develop the bridging branches, particularly in installations free of crossings according to FIGS. 1 and 2, by an outdoor technique. In the switchgear installation according to FIGS. 3 and 4, it is advantageous to have the bridging branch sections crossing each other in the form of tubular gas cables or cable connections that are placed adjacent to each other. It is, however, also possible to lay them out in the form of outdoor sections crossing each other.

I claim:

1. A switching network comprising at least four junctions connected in the form of an annulus by means of disconnectable current branches, said junctions being divided into at least two groups each containing at least two junctions; and a plurality of bridging branches for selectively connecting each junction in one group with any junction in the other group, said bridging branches having a common load switch and being further comprised of a first plurality of disconnecting switches connected between one terminal of said load switch and respective junctions of said one group and a second plurality of disconnecting switches connected between the other terminal of said load switch and respective junctions of said other group.

2. The switching network of claim 1 wherein said junctions are divided into four groups wherein said first plurality and second plurality of disconnecting switches are respectively connected to the junctions in a first group and a second group; and further including a second load switch, a third plurality of disconnecting switches respectively connected between one terminal of said second load switch and the junctions in a third group, and a fourth plurality of disconnecting switches respectively connected between the other terminal of said second load switch and the junctions in the fourth group.

3. A switching network according to claim 2 characterized in that the groups contain all of the junctions in the network.

4. A switching network according to claim 2 characterized in that at least one of the bridging branches connected to said load switch crosses at least one of the bridging branches connected to said second load switch.

5. The switching network of claim 4 wherein the bridging branches connected to said one terminal of said load switch cross the bridging branches connected to said one terminal of said second load switch, and the bridging branches connected to said other terminal of said load switch cross the bridging branches connected said other terminal of said second load switch.

* * * * *